United States Patent
Mah

(10) Patent No.: US 11,452,579 B2
(45) Date of Patent: Sep. 27, 2022

(54) SYSTEMS AND METHODS FOR DESIGNING, AND IMPROVING RETENTION OF, ORTHODONTIC ALIGNERS

(71) Applicant: ClearCorrect Operating, LLC, Round Rock, TX (US)

(72) Inventor: James Mah, Las Vegas, NV (US)

( * ) Notice: Subject to any disclaimer, the term of this patent is extended or adjusted under 35 U.S.C. 154(b) by 389 days.

(21) Appl. No.: 16/627,318

(22) PCT Filed: Jun. 15, 2018

(86) PCT No.: PCT/US2018/037894
§ 371 (c)(1),
(2) Date: Dec. 29, 2019

(87) PCT Pub. No.: WO2019/009992
PCT Pub. Date: Jan. 10, 2019

(65) Prior Publication Data
US 2020/0205937 A1  Jul. 2, 2020

Related U.S. Application Data

(63) Continuation of application No. 15/640,941, filed on Jul. 3, 2017, now abandoned.

(51) Int. Cl.
*A61C 7/08* (2006.01)
*A61C 7/00* (2006.01)
*A61C 9/00* (2006.01)

(52) U.S. Cl.
CPC ............... *A61C 7/08* (2013.01); *A61C 7/002* (2013.01); *A61C 9/0053* (2013.01)

(58) Field of Classification Search
CPC ................................. A61C 7/08; A61C 7/002
See application file for complete search history.

(56) References Cited

U.S. PATENT DOCUMENTS

| | | | |
|---|---|---|---|
| 6,183,248 B1 * | 2/2001 | Chishti | A61C 7/08 433/24 |
| 9,888,982 B2 | 2/2018 | Lee | |
| 2014/0142897 A1 * | 5/2014 | Kuo | G16H 50/50 703/1 |

OTHER PUBLICATIONS

International Search Report and Written Opinion issued in connection with PCT/US2018/037894, filed Jun. 15, 2018.

* cited by examiner

*Primary Examiner* — Ralph A Lewis

(57) ABSTRACT

Systems and methods for designing thermoformed removable orthodontic aligners and improving the retention of such aligners to patient teeth are disclosed. The systems generally include a digital scanner that is configured to obtain a digital image of a patient's dentition and a computing environment that is configured to receive a copy of the digital image; create a reference plane relative to one or more teeth featured within the digital image; position a line that runs perpendicular from the reference plane and runs tangential to a height of maximum convexity of each of the one or more teeth; measure an area of undercut between such perpendicular line and an exterior surface of each of the one or more teeth; repeat the foregoing steps at a plurality of points along the perimeter of each of the one or more teeth; and construct a three-dimensional model of an undercut area for each of the one or more teeth.

3 Claims, 9 Drawing Sheets

SYSTEMS AND METHODS FOR DESIGNING, AND IMPROVING RETENTION OF, ORTHODONTIC ALIGNERS

CROSS-REFERENCE TO RELATED APPLICATIONS

This application is the National Stage filing under 35 U.S.C. 371 of International Application No. PCT/US2018/037894, filed on Jun. 15, 2018, which claims the benefit of and priority to U.S. patent application Ser. No. 15/640,941, filed on Jul. 3, 2017, both of which are incorporated herein by reference in their entirety.

FIELD OF THE INVENTION

The field of the present invention relates to systems and methods for designing thermoformed removable orthodontic aligners and improving the retention of such aligners to patient teeth (and, furthermore, for improving the efficacy of such treatments).

BACKGROUND OF THE INVENTION

Removable orthodontic aligners are increasingly being used to impart orthodontic tooth movement (in connection with orthodontic treatment protocols). Such orthodontic aligners are often preferred over more conventional orthodontic appliances for a variety of reasons, namely, removable orthodontic aligners have been found to be more visually desirable, comfortable, and easier to use (compared to conventional orthodontic appliances, e.g., metallic braces). Although removable orthodontic aligners have been shown to be effective in imparting desired tooth movements, challenges persist relating to the retention of such aligners on a patient's teeth. It has been shown that orthodontic aligner retention can be negatively influenced by multiple factors. In particular, it has been shown that variations in tooth morphology within a patient are often responsible for insufficient aligner retention.

Accordingly, a continuing demand exists for systems and methods that can be used for designing and manufacturing orthodontic aligners in a manner that accommodates patient-specific variations in tooth morphologies and positions. In addition, a continuing demand exists for systems and methods for designing and positioning custom attachments (engagers) for teeth, when such attachments are needed or desired to encourage enhanced retention of an orthodontic aligner to a patient's teeth. Such custom-formed attachments may further encourage desired tooth movements (i.e., improve the efficiency of an orthodontic treatment plan).

As the following will demonstrate, the inventions described herein address such continuing demands (as well as others).

SUMMARY OF THE INVENTION

According to certain aspects of the invention, systems for designing thermoformed removable orthodontic aligners and improving the retention of such aligners to patient teeth are disclosed. In certain embodiments, the systems include a digital scanner that is configured to obtain a digital image of a patient's dentition and a computing environment (with a graphical user interface) that is configured to receive a copy of (and analyze) the digital image. More particularly, within the computing environment and its associated graphical user interface, the system is further configured to create a reference plane relative to one or more teeth featured within the digital image (and position a line that runs perpendicular from the reference plane, which also runs tangential to a height of maximum convexity of each of one or more teeth being analyzed by the system). In addition, within the computing environment (and graphical user interface), the system is configured to then measure an area of undercut between such perpendicular line and an exterior surface of each of the one or more teeth being analyzed. The system is preferably configured to repeat the foregoing steps at a plurality of points along a perimeter of each of the one or more teeth—and then construct a three-dimensional model of the undercut area for each of the one or more teeth being analyzed. The three-dimensional model of the undercut area can then be used to design the interior regions of removable orthodontic aligners, such that the interior dimensions of the removable orthodontic aligners are configured to mate with and retentively sit adjacent to the undercut areas for each of the one or more teeth.

According to further aspects of the invention, methods of using the systems described herein (for designing thermoformed removable orthodontic aligners and improving the retention of such aligners to patient teeth) are encompassed by the present invention, along with removable orthodontic aligners that are designed and produced using the systems and methods described herein.

According to additional aspects of the invention, systems and methods are provided for designing and producing dental restorations (e.g., dental crowns), either temporary or permanent, which are customized to provide a desired restoration undercut for enhanced aligner retention and treatment.

According to yet further embodiments of the invention, systems and methods are provided for designing and producing aligners and restorations that are customized to exhibit integrated anti-relapse features, such as dimples, ridges, depressions, and others.

The above-mentioned and additional features of the present invention are further illustrated in the Detailed Description contained herein.

DETAILED DESCRIPTION OF THE INVENTION

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Figure 1:
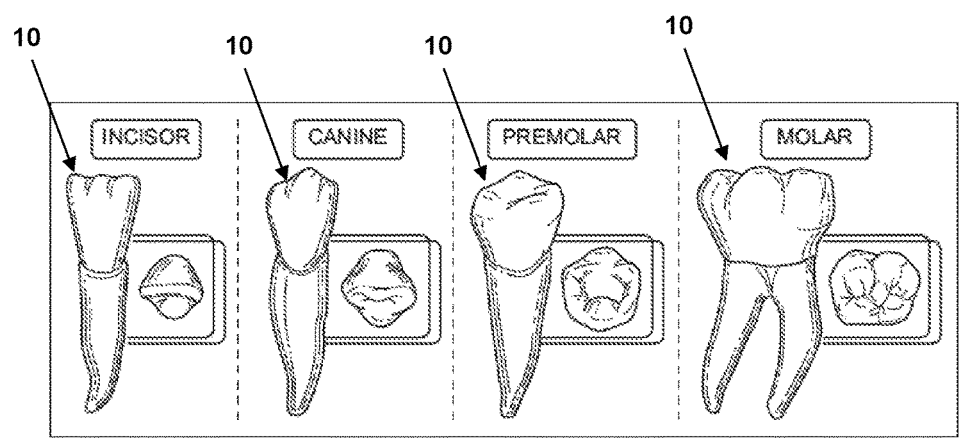
FIG. 1 is a drawing that illustrates the variations in tooth morphology that are common among various types of teeth, such as incisors, canines, premolars, and molars.
Figure 2:
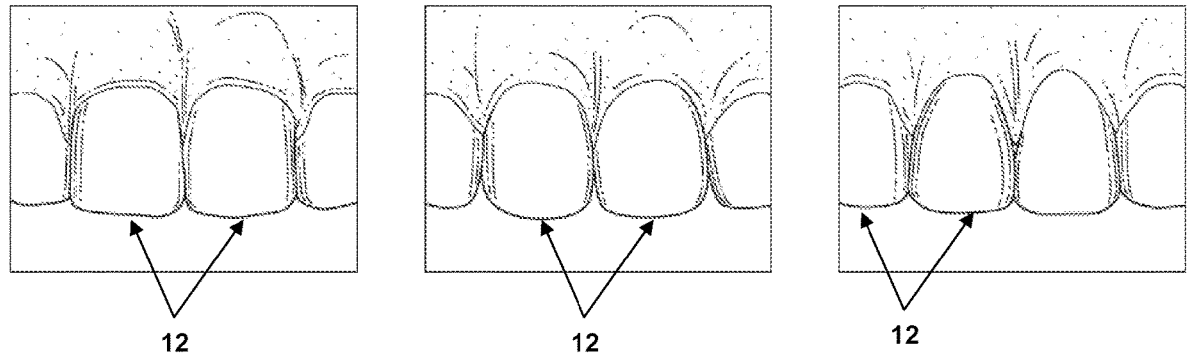
FIG. 2 is a drawing that shows the variations in tooth morphology that are common within a single type of tooth, such as the variations that commonly exist among central incisors.

Referring now to FIGS. 1 and 2, it is well known that a patient's teeth exhibit significantly different morphologies (i.e., when comparing the morphology of one tooth to another). For example, differences in morphologies exist between the crown regions 10 of teeth, as illustrated FIG. 1. In addition, significant variations also exist within a single type of tooth, such as variations that often exist among central incisors 12, as illustrated in FIG. 2. Such variations in tooth morphologies will often compromise the retentive capability of orthodontic aligners. Accordingly, as mentioned above, an object of the present invention is to provide a system and method that can be used to quantify such variations in tooth morphology (and undercuts associated with each tooth within a set of teeth), such that the internal dimensions of an orthodontic aligner may be designed and manufactured to more accurately accommodate such differences in morphology among a patient's teeth (which enhances orthodontic aligner fit, retention, and efficacy).

Figure 3:
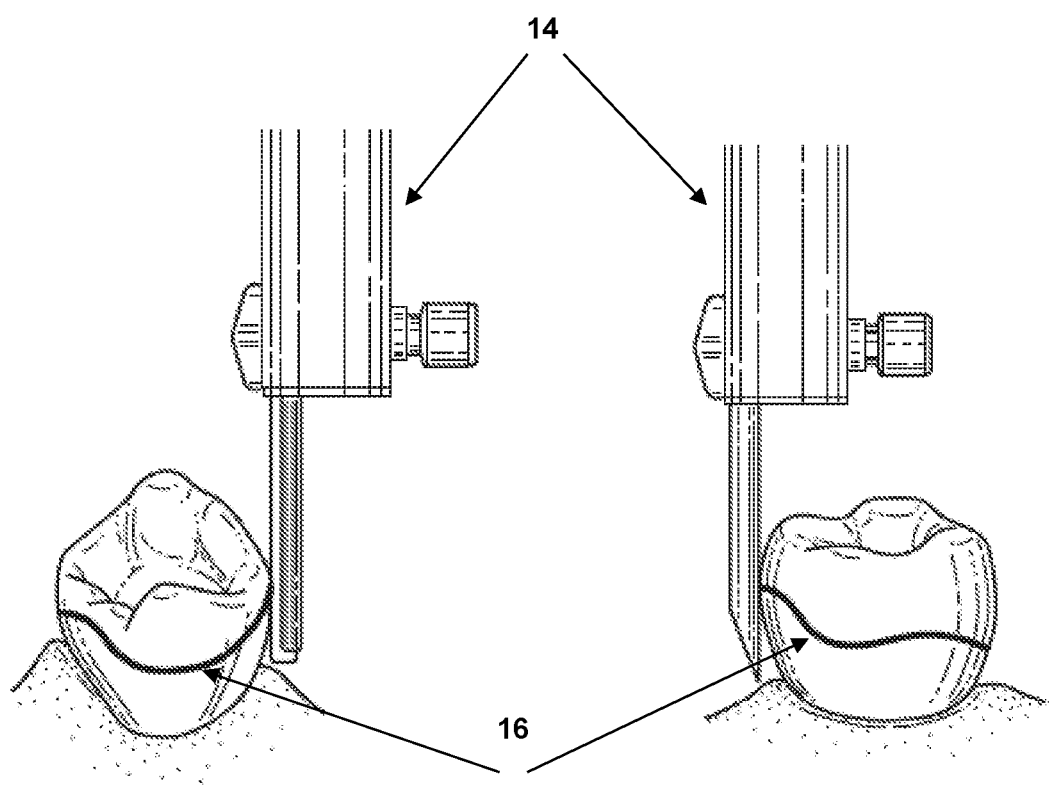
FIG. 3 is a drawing that shows the use of a dental surveyor to impart a temporary (carbon) mark or line around the height of contour (or point of first contact) of a tooth.

Referring now to FIG. 3, such differences in tooth morphology have traditionally been measured using so-called dental surveyors 14. More particularly, dental surveyors 14 have been used to mark, identify, and determine the amount of undercut of individual teeth. Notably, conventional dental surveyors 14 have been used in such capacity to assist in the design of partial dentures, but have not been used in the design of orthodontic appliances, such as removable orthodontic aligners. Referring to FIG. 3, for example, such dental surveyors 14, e.g., a Jelenko carbon marker, can be used to mark (with a temporary carbon line 16) one or more teeth and subsequently measure the height of contour (or point of first contact) between different teeth. As shown in FIG. 3, a dental surveyor 14 can be used by moving the dental surveyor 14 around the perimeter of a tooth within a single plane, such that the dental surveyor 14 is configured to impart a temporary (carbon) mark or line 16 around the height of contour (or point of first contact). Such marking procedures have been used by clinicians to then identify the amount of undercut (tooth morphology) for a particular tooth (again, which have traditionally been used in the design of partial dentures).

Figure 4:
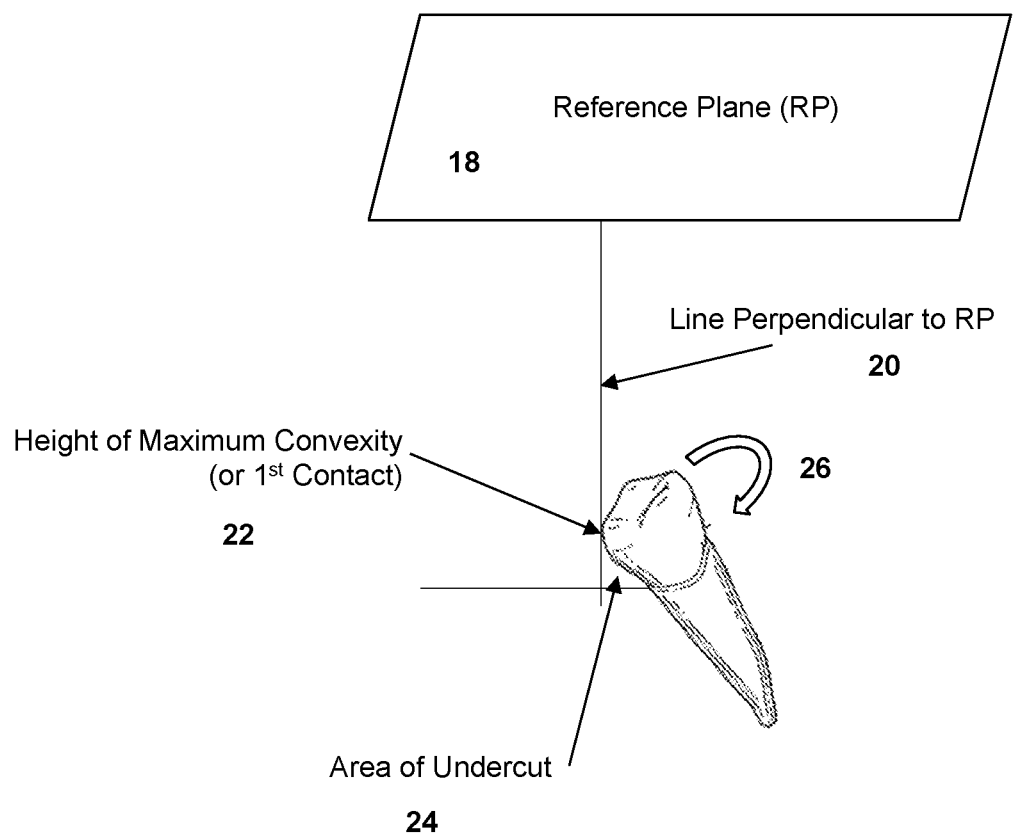
FIG. 4 is a diagram that illustrates the system of the present invention being used to (1) create a reference plane; (2) locate a line perpendicular to the reference plane which also contacts (or runs tangential to) the height of maximum convexity of a tooth; and (3) measure the area of undercut between such perpendicular line and the surface of the tooth.

The systems and methods of the present invention preferably employ the use of certain digital technologies to more accurately and efficiently identify and measure the amount of undercut (tooth morphology) for one or more teeth (instead of using more rudimentary dental surveyors 14). More particularly, the invention utilizes a computer/digital system for quantifying the undercut and retentive morphology of one or more teeth. Referring now to FIG. 4, the system of the present invention is configured to create and utilize at least one reference plane 18. The invention provides that such reference plane 18 may, for example, represent a horizontal reference plane 18. However, the reference plane 18 does not necessarily need to exhibit a horizontal orientation (a vertical or other orientation may also be employed).

The invention provides that the system is configured to then position at least one line 20 that runs perpendicular from the reference plane 18, while the perpendicular line 20 is simultaneously positioned to contact (and run tangential to) each tooth at its most protruded location 22 (the most protruded location of a tooth is also known as the "height of maximum convexity"). The perpendicular line 20 is then used by the system to identify and quantify an area 24 that exists between the perpendicular line 20 and the variable/exterior tooth surface. The invention provides that the reference plane 18—and at least one line 20 that runs perpendicular from the reference plane 18—are visualized by a user of the system within a graphical user interface of the system.

Importantly, in certain embodiments, the system of the present invention is preferably configured to execute such procedures and analyses around the entire perimeter 26 of a particular tooth (e.g., at a plurality of points around the perimeter 26 of a particular tooth). That is, the system of the present invention is preferably configured to position the perpendicular line 20, at various points around the perimeter 26 of a tooth, and subsequently quantify the area 24 between the perpendicular line 20 and the variable/exterior tooth surface. The invention provides that the plurality of area 24 values are then used by the system to compute and build a three-dimensional model of the undercut/retentive features of each tooth, which can then be used to design and manufacture an orthodontic aligner (with the internal dimensions of the aligner preferably being configured to mate fittingly with and to accommodate the precise three-dimensional undercut morphology of each tooth). The invention provides that the system is preferably configured to execute the above-described measurements and analysis for each tooth within a patient's dental arch (or copy of a dental arch, e.g., a dental stone model or digital image of a patient's dental arch).

As mentioned above, the systems and methods of the present invention preferably employ the use of certain digital technologies to more accurately and efficiently identify and measure the amount of undercut (tooth morphology) for one or more teeth. The invention provides that various types of digital technologies may be employed in such capacity. In certain preferred embodiments, for example, a three-dimensional digital image may be obtained of a patient's dentition, e.g., using digital scanning (camera) technology. The invention provides that the three-dimensional digital image may then be imported into a computing environment, e.g., a computer system that includes a central processor, memory, imaging software, and a graphical user interface. Within the computing environment, the system can be operated to then use the three-dimensional digital image to conduct the above-described measurements and analysis for each tooth within a patient's dental arch (or for those teeth that will be covered by the orthodontic aligner).

More particularly, within the computing environment, imaging software can be used that is configured to (1) create and position at least one digital reference plane 18 for each tooth to be analyzed; (2) position at least one digital line 20 that runs perpendicular from the reference plane 18 which is further oriented to contact (and run tangential to) the tooth at its most protruded location 22 (i.e., at its "height of maximum convexity"); (3) quantify the area 24 between the perpendicular line 20 and the variable/exterior tooth surface; and (4) repeat steps (1)-(3) for a plurality of locations around the perimeter 26 of the particular tooth being analyzed.

Figure 5:
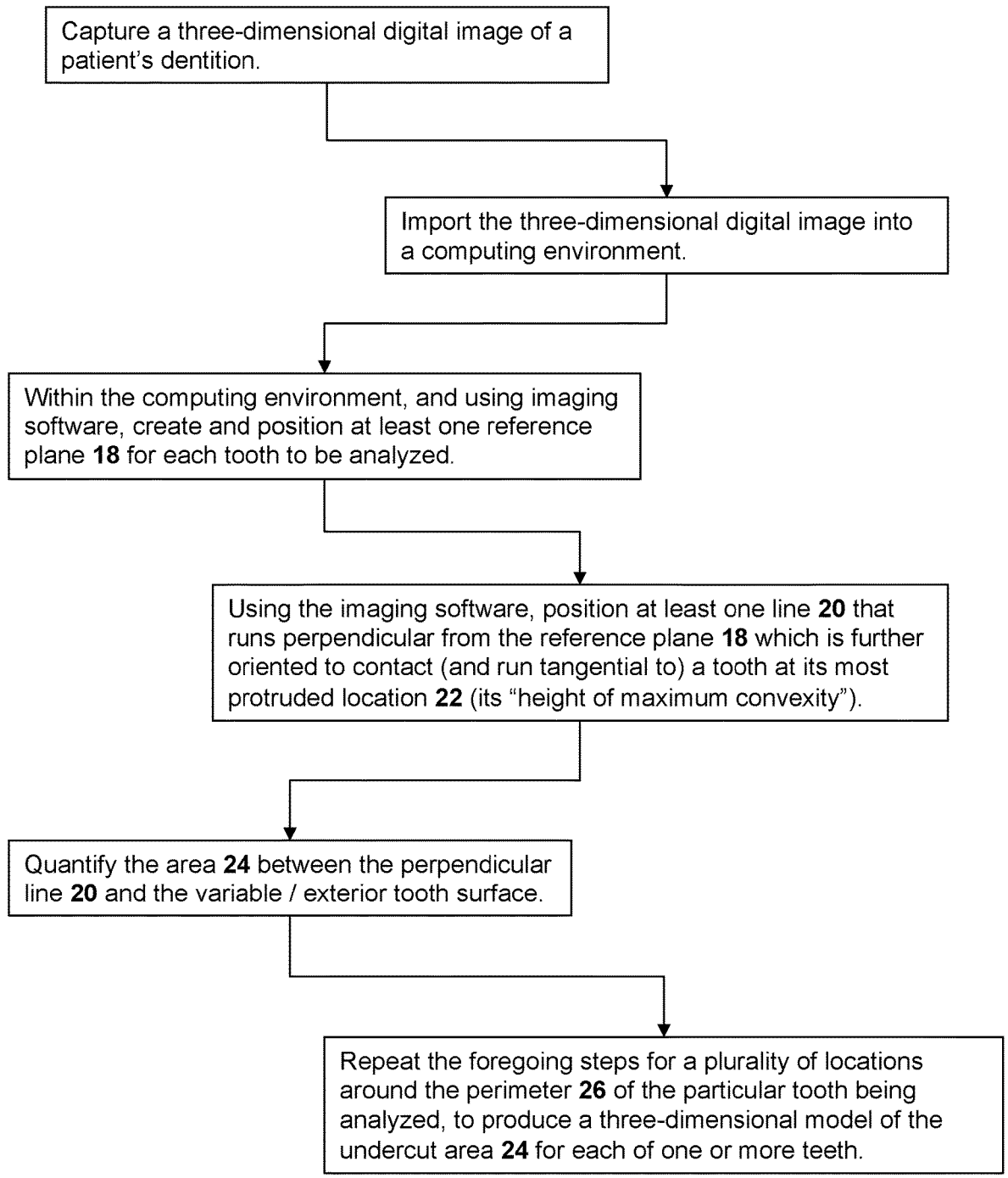
FIG. 5 is a flow diagram that summarizes certain methods of the present invention.

The invention provides that such measurements and the system can then be used to produce a three-dimensional model of the undercut areas 24 for each of one or more teeth (i.e., a three-dimensional model that represents a compilation of each area of undercut 24 calculated by the system for each of the one or more teeth). The invention provides that the system is preferably configured to translate the three-dimensional model of the undercut area 24 for each of one or more teeth into a set of dimensions that are correlated to preferred interior dimensions of a removable orthodontic aligner. In such embodiments, the preferred interior dimensions of the removable orthodontic aligner are configured to mate with and retentively sit adjacent to the undercut area of each of the one or more teeth. The invention provides that such steps and methods of using the system described herein are further encompassed by the present invention, as summarized in FIG. 5.

Figure 6:
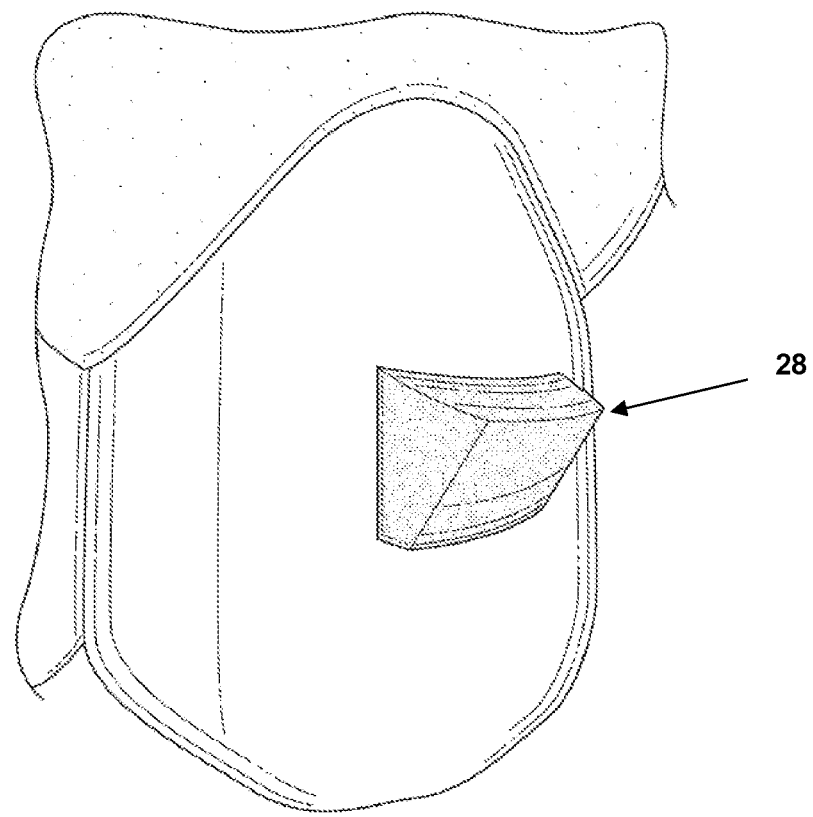
FIG. 6 is a drawing that shows an attachment (engager) affixed to a tooth, which can be used to further encourage retention between an orthodontic aligner and the underlying tooth.

Referring now to FIG. 6, when the system of the present invention is used for treatment planning and design of orthodontic aligners, a clinician may choose to supplement the undercut area (as identified and quantified by the system) by affixing dental restorative material, an attachment/bracket 28, or other material to the tooth to facilitate sufficient retention for efficient tooth movement. More particularly, the invention provides that the three-dimensional model of the undercut area 24 for each of one or more teeth may be used identify a desirable location (and size and configuration) of an attachment 28 (also known as an engager) that can be affixed to such teeth to provide even more retention between an orthodontic aligner and the patient's teeth. In such embodiments, the attachment 28 will provide additional tooth morphology, such that the orthodontic aligner can better grasp the underlying tooth. The invention provides that such attachments 28 can further be used to facilitate a variety of tooth movements, such as rotation, intrusion, extrusion, translation, tipping, and torqueing.

Figure 7:
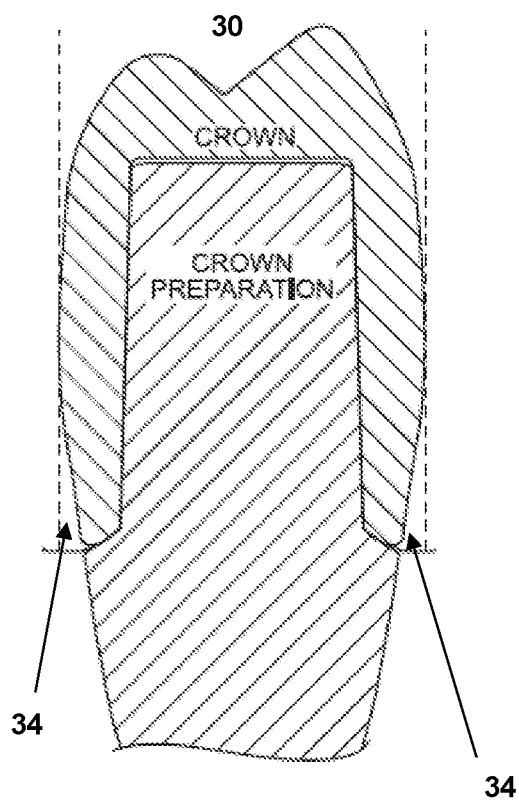
FIG. 7 is a drawing that shows a tooth crown preparation that has minimal undercut.
Figure 8:
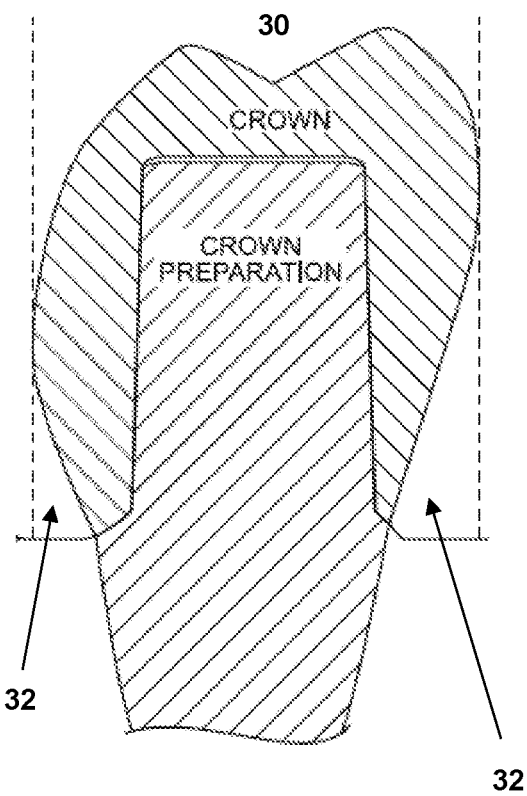
FIG. 8 is a drawing that shows another crown that is specifically designed to exhibit adequate undercut (compared to the undercut of FIG. 7), to enhance aligner retention to the tooth.

Referring now to FIGS. 7-8, according to yet further embodiments, the systems and methods of the present invention are further configured to produce (and/or utilize) dental restorations 30, e.g., dental crowns, either temporary or permanent, which are customized to provide a desired restoration undercut 32 for enhanced aligner retention and treatment. The invention provides that the desired restoration undercut 32 may be built into the restoration 30, regardless of whether an aligner will be used or not (e.g., the desired restoration undercut 32 may be built into the restoration 30 for the mere possibility that a patient may, at some time in the future, elect for aligner treatment).

More particularly, referring to FIG. 7, a tooth or restoration 30 (e.g., a crown) that is relatively flat in profile would exhibit a small amount of undercut 34 (which makes aligner retention more difficult); whereas, referring to FIG. 8, a tooth or restoration 30 (e.g., a crown) having a bulbous profile will exhibit a more desired amount of undercut 32. As explained above, the larger/desired restoration undercut 32 (FIG. 8) is used by the system to calculate a set of dimensions that are correlated to preferred interior dimensions of a removable orthodontic aligner. In such embodiments, the preferred interior dimensions of the removable orthodontic aligner are configured to mate with and retentively sit adjacent to the desired undercut area 32 of each of one or more restorations 30. In such embodiments, the specific amount of desired undercut area 32 for each tooth may be controlled by a clinician and operator of the system. Preferably, in such embodiments, the restorations 30 are fabricated with esthetic dental materials, such as porcelain and composite resins.

Figure 9:
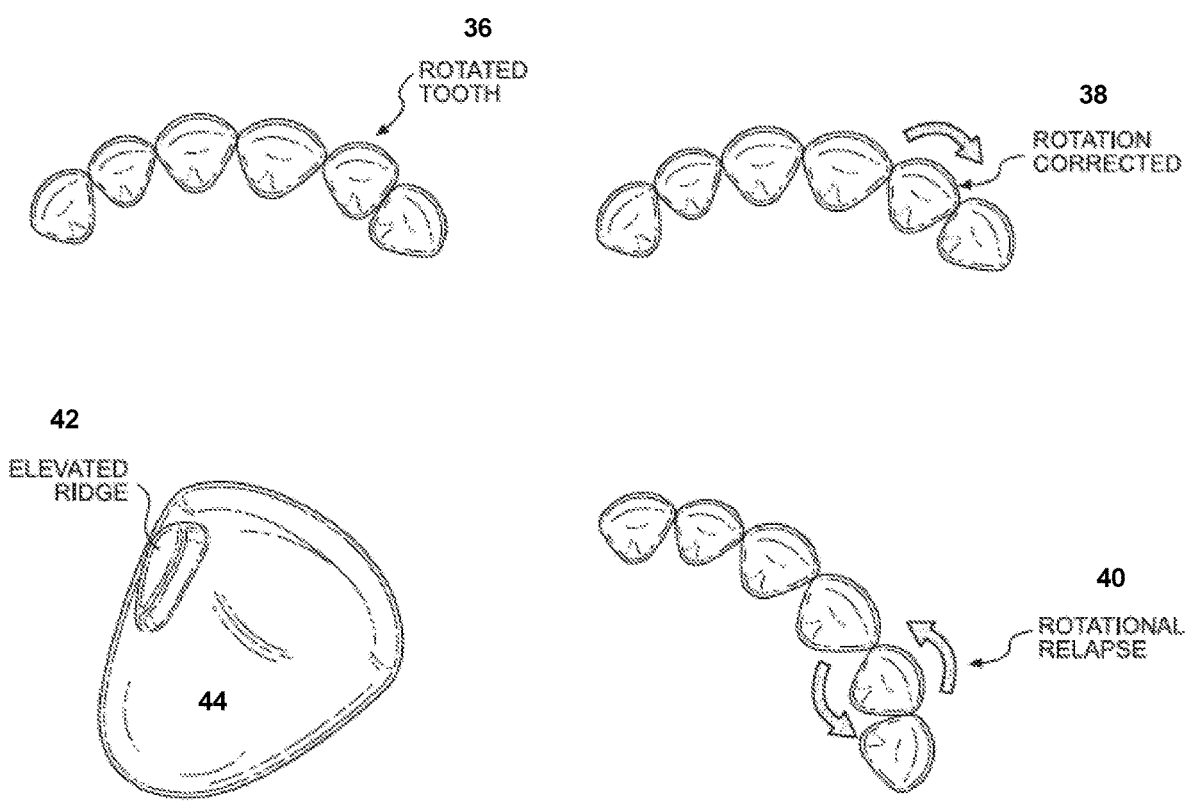
FIG. 9 is a drawing that illustrates a malpositioned tooth (rotationally malpositioned); the malpositioned tooth in a counter-rotated/corrected position; the direction of rotational relapse forces; and the location of an anti-relapse elevated ridge.
Figure 10:
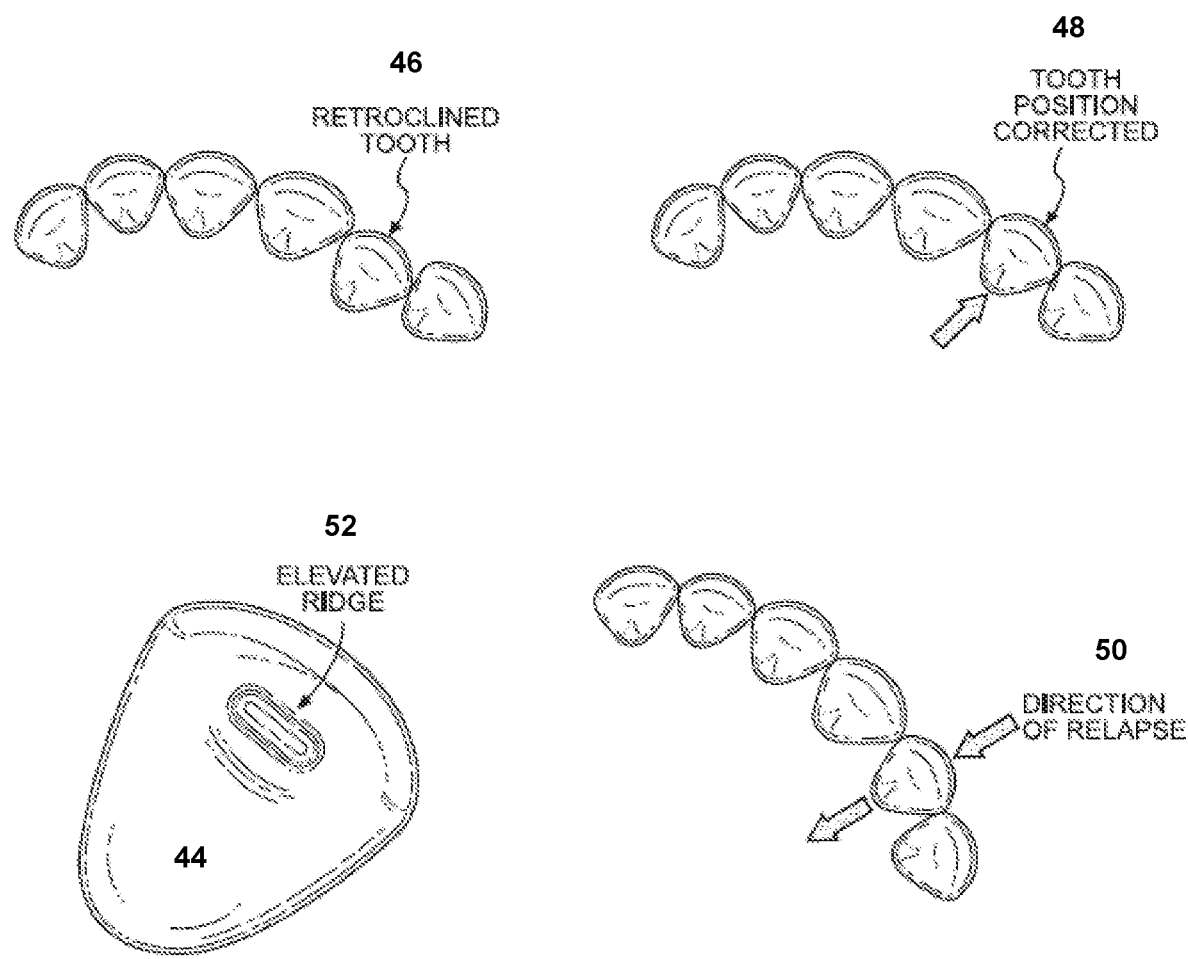
FIG. 10 is a drawing that illustrates another malpositioned tooth (a retrocline malposition); the malpositioned tooth in a corrected position; the direction of relapse forces exerted on the corrected tooth; and the location of an anti-relapse elevated ridge.
Figure 11:
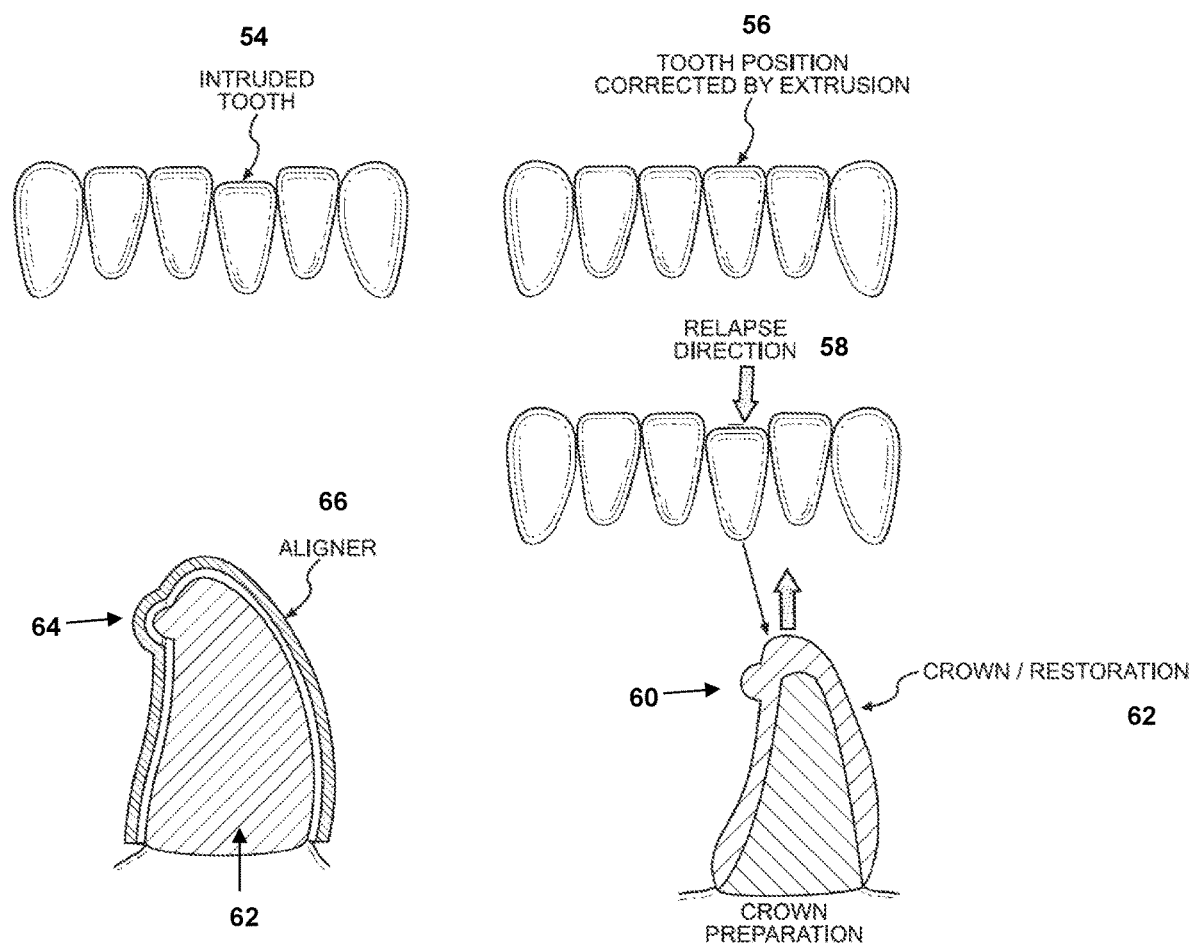
FIG. 11 is a drawing that illustrates yet another malpositioned tooth (an intruded tooth); the malpositioned tooth in a corrected position; the direction of relapse forces exerted on the corrected tooth; and the location of an anti-relapse (anti-extrusive) feature/bump on a crown and aligner.

According to yet further embodiments, the systems and methods of the present invention are further configured to produce aligners and restorations that are customized to exhibit integrated anti-relapse features, such as dimples, ridges, depressions, and others. In such embodiments, the anti-relapse features are configured to exert anti-relapse forces in a specific region of a tooth (or otherwise render relapse movement more difficult), For example a small bump or ridge on the distal lingual marginal ridge of a tooth, positioned on a lower incisor (i.e., within the portion of the aligner or restoration applied to such area of the tooth), will discourage the tooth from experiencing rotational relapse movement in that direction. FIGS. 9-11 provide yet further examples of such embodiments.

In FIG. 9, for example, a rotationally malpositioned tooth 36 is shown; a counter-rotated/corrected tooth 38 is shown (such correction being achieved through traditional orthodontic procedures); the direction of rotational relapse forces 40 are shown; and the location of an anti-relapse elevated ridge 42 (located in the portion of the aligner or restoration 44 applied to the corrected tooth 38) is shown. The invention provides that the systems described herein, when used to design and produce an aligner or restoration, may optionally include this type of anti-relapse feature (to discourage an anticipated relapse movement). In the example shown in FIG. 9, the elevated ridge 42 is integrally formed into the portion of the aligner or restoration 44—to exhibit a size, configuration, and position—that (mechanically) counteracts the anticipated rotational relapse forces 40 of the underlying corrected tooth 38.

Similarly, FIG. 10 illustrates another malpositioned tooth 46 (a retrocline malposition); a corrected tooth 48; the direction of relapse forces 50 exerted on the corrected tooth 48; and the location of an anti-relapse elevated ridge 52 of the aligner or restoration 44. In this example, the anti-relapse elevated ridge 52 of the aligner 44 is configured to exhibit a size and position that counteracts the anticipated relapse forces 50 of the underlying corrected tooth 48. Likewise, FIG. 11 illustrates yet another malpositioned tooth 54 (an intruded tooth); a corrected tooth 56; the direction of relapse forces 58 exerted on the corrected tooth 56; and the location of an anti-relapse/anti-extrusive (a bump) feature 60 on a crown/restoration 62 (as well as a corresponding anti-relapse/anti-extrusive feature 64) positioned on an aligner 66 that fits over the crown/restoration 62. The invention provides that the foregoing examples are not exhaustive. Rather, the systems and methods described herein are useful for designing and producing aligners and/or restorations that may utilize a number of different anti-relapse features, such as bumps, dots, dimples, divots, depressions, ridges (vertical, horizontal, diagonal, and other directions), and combinations of such features, to exert the desired anti-relapse force on the underlying tooth.

The invention provides that the systems and methods described herein are preferably operated to produce a production model of the desired aligner (and/or restoration). For example, after the three-dimensional model of the undercut areas 24 for each of the one or more teeth is produced (as described above) and translated into interior dimensions of the removable orthodontic aligner (and/or restoration) and, likewise, once the geometry of all desired anti-relapse features are defined, the system is configured to produce a production model of the desired aligner (and/or restoration). The production model will consist of a complete digital three-dimensional model of the desired aligner (and/or restoration), with all external and internal dimensions being defined, which can then be used to produce the desired aligner (and/or restoration), e.g., using various types of polymers and thermoforming procedures known in the art.

The many aspects and benefits of the invention are apparent from the detailed description, and thus, it is intended for the following claims to cover all such aspects and benefits of the invention that fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A removable orthodontic aligner that is configured to mate with and retentively sit adjacent to an undercut area of each of one or more teeth of a patient, wherein the removable orthodontic aligner is produced by:
   (a) operating a digital scanner to obtain a digital image of the patient's dentition;
   (b) operating a computing environment, which comprises a central processor, memory, imaging software, and a graphical user interface, to:
      (i) receive a copy of the digital image;
      (ii) create a reference plane relative to one or more teeth featured within the digital image;
      (iii) position a line that runs perpendicular from the reference plane and runs tangential to a height of maximum convexity of each of the one or more teeth;
      (iv) measure an area of undercut between such perpendicular line and an exterior surface of each of the one or more teeth;
      (v) repeat steps (i)-(iv) at a plurality of points along a perimeter of each of the one or more teeth; and
      (vi) construct a three-dimensional model that represents a compilation of each area of undercut calculated by the system for each of the one or more teeth; and
   (c) producing the removable orthodontic aligner to exhibit interior dimensions that are configured to mate with the undercut area for each of the one or more teeth depicted within the three-dimensional model and to retentively sit adjacent to the undercut area for each of the one or more teeth of the patient, wherein the removable orthodontic aligner further comprises one or more anti-relapse features, wherein the anti-relapse features are configured to discourage or prevent relapse movement of an underlying tooth.

2. The removable orthodontic aligner of claim 1, which further comprises an attachment that is configured to (a) be affixed to the one or more teeth and (b) enhance retention of the removable orthodontic aligner to the one or more teeth.

3. The removable orthodontic aligner of claim 1, wherein the anti-relapse features comprise one or more bumps, dots, dimples, divots, depressions, ridges, or combinations of the foregoing, which exhibit a configuration and are positioned within the aligner to discourage or prevent relapse movement of an underlying tooth.

* * * * *